United States Patent [19]
Rud, Jr. et al.

[11] Patent Number: 4,777,826
[45] Date of Patent: Oct. 18, 1988

[54] TWIN FILM STRAIN GAUGE SYSTEM

[75] Inventors: Stanley E. Rud, Jr., Eden Prairie; Mark G. Romo, Richfield; Robert C. Bohara; Thomas A. Knecht, both of Eden Prairie, all of Minn.

[73] Assignee: Rosemount Inc., Eden Prairie, Minn.

[21] Appl. No.: 23,962

[22] Filed: Mar. 10, 1987

Related U.S. Application Data

[63] Continuation of Ser. No. 767,621, Jun. 20, 1985, abandoned.

[51] Int. Cl.$^4$ .......................... G01L 19/04; G01L 1/22
[52] U.S. Cl. ....................................... 73/708; 73/766; 73/862.67; 338/4
[58] Field of Search ................. 73/765, 769, 774, 777, 73/727, DIG. 4, 862.65, 1 B, 1 R, 720, 721, 766, 862.48, 862.63, 726, 727, 708, 862.67; 338/2, 4, 5, 6, 3; 29/610 SG

[56]  References Cited

U.S. PATENT DOCUMENTS

| | | | |
|---|---|---|---|
| 3,697,918 | 10/1972 | Orth et al. | 338/3 |
| 4,166,269 | 8/1979 | Stephens et al. | 338/5 |
| 4,432,247 | 2/1984 | Takeno et al. | 338/2 |
| 4,442,717 | 4/1984 | Kurtz et al. | 73/777 |
| 4,576,052 | 3/1986 | Sugiyama | 73/862.63 |
| 4,628,296 | 12/1986 | Kitagawa et al. | 338/3 |

FOREIGN PATENT DOCUMENTS

| | | | |
|---|---|---|---|
| 0093222 | 6/1982 | Japan | 73/862.65 |
| 0118930 | 7/1983 | Japan | 73/862.65 |
| 0208633 | 12/1983 | Japan | 73/862.65 |
| 0885842 | 11/1981 | U.S.S.R. | 73/862.65 |

Primary Examiner—Stewart J. Levy
Assistant Examiner—Robert R. Raevis
Attorney, Agent, or Firm—Kinney & Lange

[57] ABSTRACT

A strain gauge sensor for providing an electrical output responsive to a parameter applied to a substrate. A homogenous thin film circuit is deposited on an insulating layer which is deposited on a substrate of single-crystal material. The thin film circuit includes a strain gauge responsive to strain transferred through the insulating layer from the substrate and resistance trimming networks trimmed by removal of thin film material from the trimming networks to adjust zero and gain. A diaphragm is etched in the substrate to form a pressure sensor. An optional support layer may be added to the sensor for mounting the sensor to a surface.

20 Claims, 3 Drawing Sheets

TWIN FILM STRAIN GAUGE SYSTEM

This is a continuation of application Ser. No. 767,621, filed June 20, 1985 (now abandoned).

FIELD OF THE INVENTION

This invention relates to a thin film strain gauge sensor for providing an electrical output responsive to a parameter applied to a substrate of single-crystal material.

DESCRIPTION OF THE PRIOR ART

Thin film strain gauge sensors with means for adjusting resistance values thereof by selecting or shorting taps are taught in U.S. Pat. No. 4,428,976. U.S. Pat. No. 4,333,349 teaches selective shorting of resistances to achieve a desired resistance in an integrated semiconductor transducer. U.S. Pat. No. 4,462,018 describes a semiconductor strain gauge with integral compensation resistors. The presence of multiple materials in strain gauge bridges gives rise to output errors due to differences in temperature coefficients of resistance of the materials and stray thermal EMF's.

SUMMARY OF THE INVENTION

This invention relates to a thin film strain gauge sensor that is conveniently batch-fabricated and includes a thin film strain gauge circuit formed of a homogenous material and deposited on an insulating layer on a planar single-crystal substrate.

The thin film circuit is formed by deposition on the insulating layer to provide a strong, substantially hysteresis-free bond between the thin film circuit and the insulating layer. The thin film circuit includes thin film strain gauges disposed on the insulating layer over regions of the substrate and said regions are strained by stress applied to the substrate.

A preferred form of the invention includes a sensing diaphragm formed in the substrate that is strained by a pressure applied to the diaphragm. An external source electrically excites the thin film circuit to provide an output signal indicative of applied pressure. The thin film circuit further includes a resistive trimming network for adjusting the output signal to substantially a desired level at a selected pressure during manufacture of the sensor. Adjustment is made by removing portions of the thin film material in the trimming network. The thin film circuit also includes interconnects which electrically connect the strain gauges and the resistive trimming network together to form the thin film circuit. The thin film circuit is formed of a single homogenous material so that the strain gauges, the resistive trimming network and the interconnects all have substantially the same temperature coefficient of resistance. The thin film circuit is arranged such that the desired level of the output signal with constant voltage excitation to the circuit is determined by a mathematical ratio having resistances of portions of the thin film circuit as terms of the ratio's numerator and denominator. Substantially the same temperature coefficients appear in the ratio's numerator and denominator and cancel mathematically. The desired output level is substantially independent of the temperature of the thin film circuit because the ratio of resistances is substantially unaffected by a temperature change.

The insulating layer is formed by deposition on a portion of a first surface of a single-crystal substrate to provide a strong, hysteresis-free bond between the insulating layer and the substrate. A first side of the sensing diaphragm is included in the first surface. The material in the insulating layer is selected to have electrical insulating properties over a wide operating temperature range. The insulating layer insulates the thin film circuit from the substrate to minimize a flow of undesirable leakage current from the thin film circuit through the semiconducting substrate.

The sensing diaphragm is formed in the substrate of single-crystal material. The sensing diaphragm is formed by etching a cavity from a second surface, opposite the first surface on the single-crystal substrate, to a desired depth in the single-crystal substrate. An etch-resistant layer is formed on the second surface. An aperture in the etch-resistant second layer photolithographically defines the extent of the cavity at the second surface. The cavity is etched through the aperture to the desired depth in the single-crystal substrate, thereby forming a second side of the sensing diaphragm and leaving an unetched rim around the diaphragm. The sensing diaphragm is formed from single-crystal material to provide substantial freedom from mechanical hysteresis. The etching of the cavity in single-crystal material forms a diaphragm with a well-defined position in the substrate.

DETAILED DESCRIPTION OF THE PREFERRED EMBODIMENTS

Figure 1:
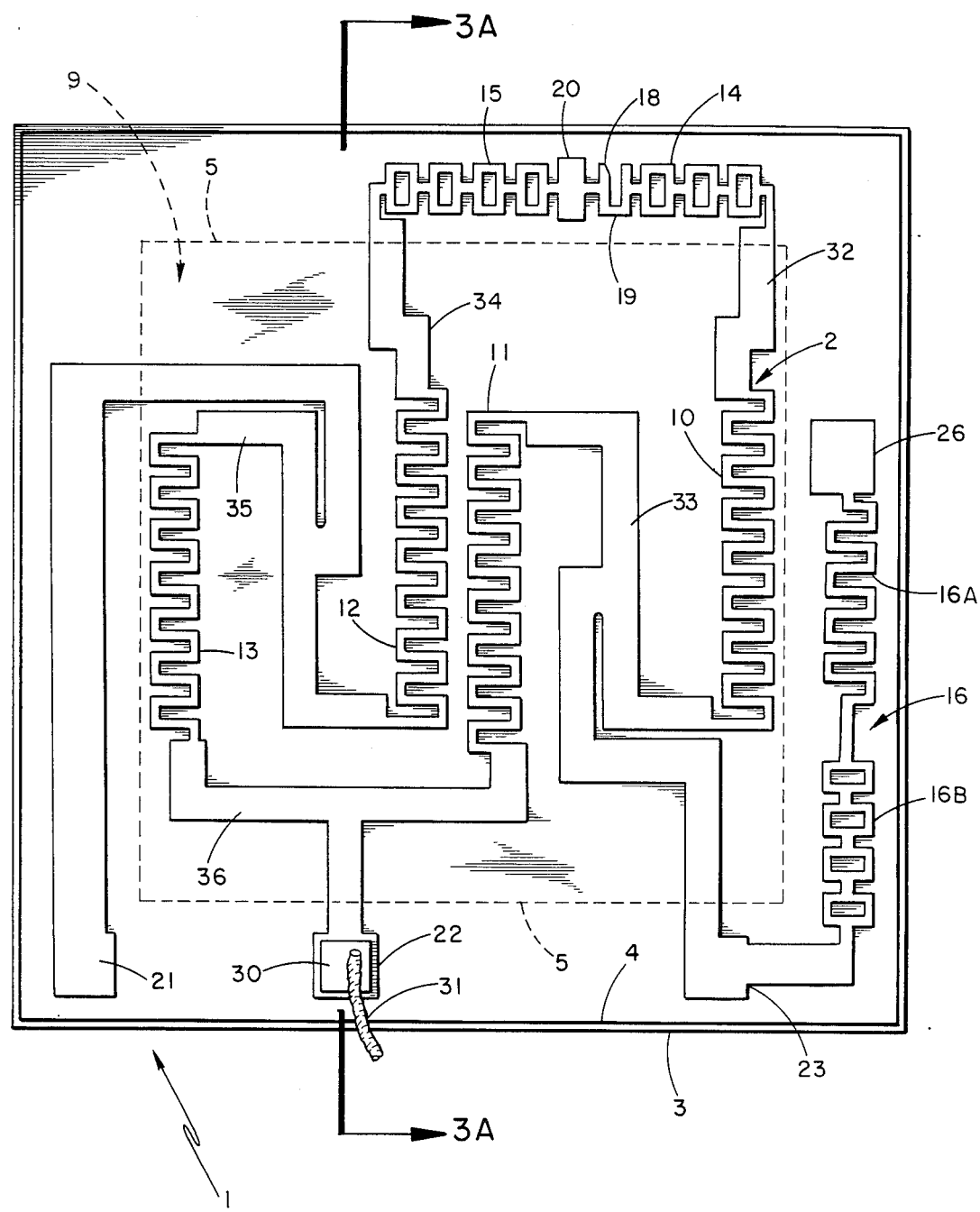
FIG. 1 is a plan view of a thin film strain gauge pressure sensor made according to this invention.

FIG. 1 is a plan view of a thin film strain gauge pressure sensor 1 according to this invention. The sensor comprises a substrate 6 (shown in FIG. 3A) having an insulating layer 3 deposited thereon. The sensor further comprises a thin film circuit 2 deposited on a surface of the insulating layer 3. A passivation layer 4 (outlined in FIG. 1 and shown in FIG. 3A) is conformally deposited on the thin film circuit and the insulating layer. A continuous sheet of the thin film material is deposited on the surface of the insulating layer and the thin film material is then photolithographically fabricated (etched) to leave only the thin film circuit pattern on the surface. The term "deposited" as used in this specification means formed or grown on a surface by exposing the surface to a material. Vapor deposition, thermal growth, oxidation, and sputtering are examples of deposition processes which can be used in accordance with the present invention.

Figure 3A:
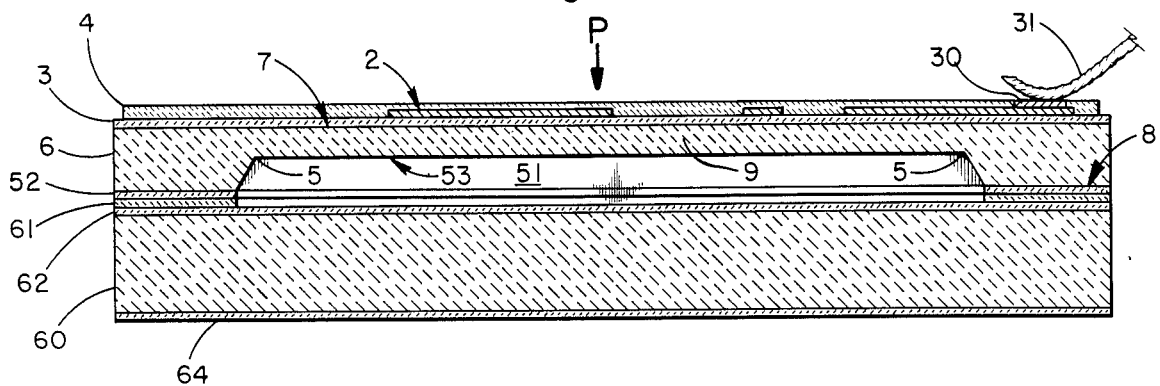
FIGS. 3A, 3B, 3C are cross-sectional representations of three preferred embodiments of sensors according to this invention.

The thin film circuit 2 includes strain gauges 10, 11, 12, 13 formed in serpentine patterns and disposed over stressed regions of the insulating layer 3 which are stressed as a result of pressure applied to diaphragm 9. Dashed line 5 in FIG. 1 shows the location of an edge of a diaphragm 9 underlying insulating layer 3. The diaphragm 9 applies stress through the insulating layer 3 to the strain gauges 10, 11, 12 and 13. A compressive strain is applied to strain gauges 11 and 12 and a tensile strain is applied to strain gauges 10 and 13 when a pressure P is applied to the sensor as shown in FIG. 3A. The strain gauges vary in resistance in response to the stress caused by a pressure applied to the diaphragm. The resistance change affects the output of the thin film circuit to provide an indication of pressure. For purposes of illustration, the serpentine paths of the strain gauges are shown with wide line widths and widely spaced alternations. The serpentine paths of the strain gauges shown in FIG. 1, however, may be made thinner and longer with more closely spaced alternations to achieve a desired resistance.

The thin film circuit 2 further includes a resistive trimming network 14 which comprises multiple patterns of electrically parallel resistances (resistor links) in the thin film. The multiple patterns of electrically parallel resistances are connected electrically in series to form the trimming network 14. The resistor links may have equal or unequal resistances. A total resistance of network 14 is conveniently increased by severing resistances in parallel resistance patterns. Resistor links may be severed in more than one of the parallel patterns so long as one resistor link is left unsevered in each parallel pattern. The trimming network 14 and the severing procedure provide an adjustable resistance in the thin film circuit. Resistances 18 and 19 form one of the parallel resistance patterns of network 14. The resistance of network 14 has been increased by removing a portion of resistance 18. While resistance 18 is open-circuited, however, the resistance 19 is left unsevered to complete the circuit. Connections external to the thin film circuit 2 to adjust resistance, such as jumper wires, taps and potentiometers, are thus avoided. Such external adjustment means are undesirable because they may increase size and complexity or introduce into the electrical circuit vibration sensitivity, stray thermal EMF's, or materials having a different temperature or having a different temperature coefficient of resistance than the thin film.

Trimming network 15 is similar to trimming network 14 and provides an additional adjustable resistance. For purposes of illustration, only four parallel combinations with wide line widths are shown. The patterns of the resistive trimming networks 14 and 15 shown in FIG. 1 may be made, however, using finer thin film line widths and closer spacings to provide more than the four parallel combinations per trimming network shown in FIG. 1. Resistance links in the trimming networks may have equal or different resistance values to achieve desired adjustments. Networks with more parallel combinations are preferred because they permit a finer adjustment of the total resistance of the network. A gain-setting resistance 16 comprises a serpentine fixed resistance 16A and a trimming resistance 16B connected in series electrically and disposed on the insulating layer over a relatively unstressed region of the substrate. The fixed resistance portion 16A of gain-setting resistance 16 is shown with only a few alternations for purposes of illustration, however, these portions may be made with thinner line widths and more alternations to achieve a desired resistance. The trimming resistance portion 16B of gain-setting resistance 16 is shown with only four parallel combinations for purposes of illustration; more parallel combinations may be preferred to achieve a finer adjustment of the total resistance of the gain-setting resistance. Gain-setting resistance 16 may alternatively be disposed on an insulating layer of a separate substrate. The trimming networks 14, 15, and 16B provide adjustments for standardizing the characteristics of the thin film circuit, such as zero and span, to enhance interchangeability.

Thin film circuit 2 further includes contact areas 20, 21, 22 and 23 for receiving bonding pads and bond wires which connect the thin film circuit 2 to external circuitry. Contact area 26 provides for connection to gain-setting resistance 16. A bonding pad 30, for example, is formed of aluminum and deposited on thin film contact area 22. A gold bond wire 31 is attached to the bonding pad 30 and provides an electrical connection to an external circuit.

The thin film circuit 2 further includes interconnects such as interconnects 32, 33, 34, 35 and 36 which provide low resistance connections between other portions of the thin film circuit.

Figure 2:
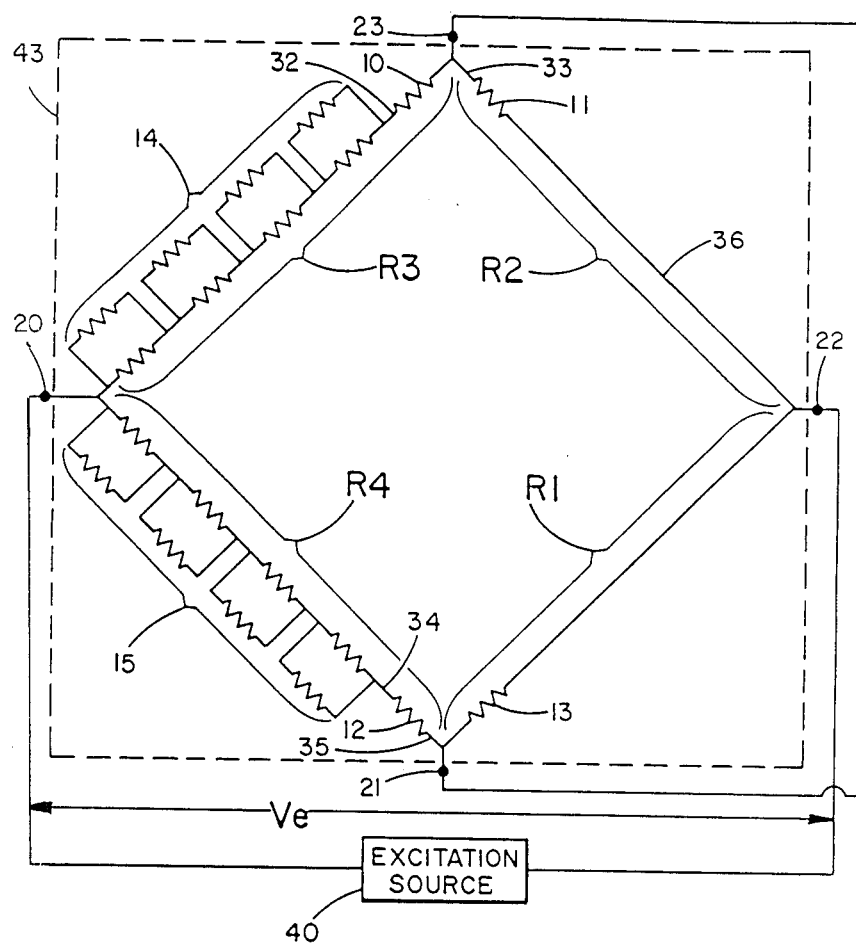
FIG. 2 is a schematic electrical diagram showing a thin film strain gauge circuit made according to this invention.

In FIG. 2, an electrical schematic diagram, the thin film circuit 2 is shown connected to an excitation source 40 and a signal processor 41. The reference numerals in FIG. 2 that are the same as those in FIG. 1 identify corresponding schematic representations of portions of the thin film circuit. The excitation source 40 provides electrical excitation to a Wheatstone bridge circuit 43. The excitation source excites the Wheatstone bridge 43 at contacts 20 and 22 and may include a voltage or current source and a source impedance. The excitation source 40 may provide the bridge with a DC excitation or a time variant excitation waveform.

The Wheatstone bridge circuit 43 comprises strain gauges 10, 11, 12, 13 and resistive trimming networks 14, 15 and interconnects 32, 33, 34, 35, 36. The Wheatstone bridge has four bridge arms with resistances having values R1, R2, R3, and R4 as shown in FIG. 2. The Wheatstone bridge circuit 43 provides a bridge output at contacts 21 and 23 representative of a pressure applied to the sensor 1. The bridge output is controlled by variations of the resistances of the strain gauges responding to the applied pressure. The output at contacts 21 and 23 is connected to a signal processor 41 which processes the bridge output to produce a processed output 42 also representative of pressure applied to the sensor 1.

The resistive trimming networks 14 and 15 are included in the bridge circuit 43 for trimming (adjusting) the bridge output to a desired level at a selected applied pressure during manufacture of the sensor. With an excitation voltage Ve between contacts 20 and 22 and a high impedance presented to the bridge output by the signal processor, a bridge output voltage Vb is described by Equation 1:

$$Vb = \frac{Ve\,(R1 \times R3 - R4 \times R2)}{(R3 + R2)(R1 + R4)} \qquad \text{Equation 1}$$

It can be seen from Equation 1 that the bridge output Vb is adjusted to a desired zero level if a numerator term (R1xR3−R4xR2) of Equation 1 equals zero as in Equation 2:

(R1xR3−R4xR2)=0     Equation 2

The bridge output voltage Vb is adjusted in a positive direction by increasing R3 and the bridge output voltage is adjusted in a negative direction by increasing R4. Severing a resistance in resistive trimming network 15 increases R4 and severing a resistance in resistive trimming network 14 increases R3. Hence resistive trimming network 14 or 15 is trimmed to adjust bridge output voltage Vb in either the positive or negative direction as needed to adjust Vb to the desired level at the selected applied pressure during manufacture of the sensor.

The Wheatstone bridge circuit 43 of FIG. 2 may be fabricated alternatively to have a non-zero output level of a desired polarity and a nominal amplitude at the selected pressure prior to trimming. A single trimming network 14 may then be trimmed to adjust the output to the desired output level and network 15 may be eliminated from the bridge.

The thin film circuit 2 is formed of a homogenous material such that the thin film circuit's coefficient of resistance is uniform throughout the thin film circuit and thermal EMF's are avoided. Stray thermal EMF's or thermal electromotive forces are a result of the well known Seebeck Effect. The Seebeck Effect is defined in the IEEE Dictionary of Electrical and Electronic Terms, 2nd Edition (1977) as " . . . the generation of an electromotive force by a temperature difference between the junctions in a circuit of two homogeneous electrical conductors of dissimilar composition . . . " The homogenous thin film balanced Wheatstone bridge provides a desired low temperature coefficient of the output's zero point without the addition of temperature compensating components. The thin film circuit is formed preferably from either a nickel-chromium alloy or doped polycrystalline silicon. The nickel-chromium alloy is preferred because it has a low temperature coefficient of resistance and a low temperature coefficient of gauge factor which provides a stable span needed for some applications. Polycrystalline silicon is preferred for other applications because it forms a piezoresistor with a high gauge factor. The high gauge factor is desirable because it provides a high output level and effects of drifts and zero shifts with temperature become a smaller percentage of the processed output. Fabrication of the bridge circuit from a single homogenous material in combination with the trimming method which introduces no other material into the bridge results in a bridge output that is adjusted to zero at a selected pressure substantially independent of the temperature of the bridge circuit. The terms of Equation 2 are rearranged mathematically to provide Equation 3 which also describes the conditions for adjusting Vb to zero.

$$\frac{R1 \times R3}{R2 \times R4} = 1 \qquad \text{Equation 3}$$

Equation 3 describes the condition for adjusting Vb to zero as a ratio having numerator and denominator terms. Both the numerator and denominator of the ratio in Equation 3 have resistance terms in them with substantially the same temperature coefficients of resistance because all of the resistances in Equation 3 are formed from a homogenous thin film.

The signal processor 41 includes an amplifier 44 having a gain for amplifying the bridge output to produce a processed output 42 indicative of applied pressure. The amplifier's gain is controlled by the gain-setting resistance 16. The gain is trimmed with gain-setting resistance 16B so that the product of the gain of the signal processor times the measured pressure sensitivity factor of the sensor is a substantially fixed value for a selected group of sensors. The term "pressure sensitivity factor" as used in this specification is a ratio of a change of an amplitude of an output of the thin film circuit to a change of an applied pressure at a given excitation. With this adjustment made, substantially the same change in the processed output is produced for the same pressure change for pressure sensors of the selected group. This method of gain adjustment in combination with the zeroing adjustment of Vb at a selected pressure results in interchangeability of sensors without recalibration of the signal processing circuitry.

Other portions of the circuitry may be included in the thin film circuit 2 within the scope of this invention. For example, the source impedance of excitation source 40 may include a portion of the thin film material on the sensor. Other gain setting or biasing resistances in signal processor 41 may also be fabricated from the thin film material on the sensor.

FIG. 3A is a cross-sectional representation of a first embodiment of sensor 1 taken along line 3A—3A in FIG. 1. A passivation layer 4 is deposited on the thin film circuit 2 and insulating layer 3 as shown in FIG. 3A. The passivation layer is electrically insulating so that undesired current through layer 4 from the thin film circuit is minimized. The passivation layer 4 is a sealing, conformal, corrosion-resistant barrier which substantially protects the thin film circuit 2 from damage by reaction with chemicals in a application environment to which the sensor is exposed. The passivation layer 4 also serves as a barrier to minimize undesirable leakage current from the thin film circuit through moisture in the application environment. The passivation layer 4 is preferably silicon nitride, polycrystalline silicon, silicon dioxide, or Union Carbide's Parylene brand conformal coating.

The thin film circuit 2 is deposited on the insulating layer 3 and layer 3 is deposited on a first surface 7 of the substrate 6 of a single-crystal material. The deposition of the thin film circuit 2 on the insulating layer 3 and the deposition of the insulating layer 3 on the substrate 6 forms strong stable bonds between the materials. These strong, stable bonds transmit stress from the substrate 6 to the strain gauges 10, 11, 12 and 13 in the thin film circuit 2 with a minimum of undesired hysteresis and creep contributing to inaccuracy in the sensor's output. There are no adhesives between the thin film, the insulating layer, and the substrate to contribute to hysteresis or creep. The presence of the insulating layer 3 between the thin film circuit 2 and the substrate 6 prevents undesired electrical leakage from the thin film circuit 2 through the substrate 6.

The insulating layer 3 must also be resistant to an etching solution used to etch the thin film pattern. Insulating layer 3, for example, may be formed of silicon nitride or silicon dioxide. A preferred embodiment for insulating layer 3 which has enhanced etch-resistance is a layer which includes layers of silicon nitride and silicon dioxide.

The first surface 7 of the substrate 6 includes a first side of a planar sensing diaphragm 9 bounded by an edge at 5. The sensing diaphragm is formed by etching a cavity 51 in the substrate 6. The cavity is etched from a second surface 8, opposite the first surface 7 of the substrate 6, to a desired depth in the substrate 6. Etching of the cavity 51 is accomplished by depositing an etch-resistant layer 52 on the second surface 8 of the substrate 6. Layer 52 may be a layer of silicon nitride, for example. The etch-resistant layer has an aperture through it formed photolithographically. The aperture defines the extent of the cavity 51 at the second surface 8 of the substrate 6 and the cavity 51 is etched through the aperture to the desired depth in the substrate 6, thereby forming the second side 53 of the diaphragm 9. The material of substrate 6 is preferably single-crystal silicon having major surfaces 7 and 8 with a Miller Index (100) orientation.

An optional support layer 60 is attached to the substrate 6 through etch-resistant layer 52, frit 61, and layer of material 62, preferably silicon nitride or silicon dioxide, which facilitates bonding of the silicon support layer 60 to the frit 61. The support layer 60 is attached to the substrate 6 in an evacuated environment so that cavity 51 is evacuated and a substantially zero reference pressure is applied to the second side 53 of the sensing diaphragm 9. The sensor in FIG. 3A thus senses an absolute pressure. Layer 60 may also be alternatively attached in a pressurized atmosphere to provide a non-zero reference pressure to the second side of the diaphragm.

The sensor in FIG. 3A responds to a pressure P applied to the first side of the sensing diaphragm 9. The pressure exerts a force on the sensing diaphragm 9. The sensing diaphragm 9 is strained by this force and the strain is transmitted through the insulating layer 3 to the strain gauges 10, 11, 12, 13. The strain gauges 10, 11, 12, 13 are arranged over stressed regions of the substrate 6. The stress varies the electrical resistance of the strain gauges 10, 11, 12, 13. The thin film circuit 2 including the strain gauges produces an output indicative of the applied pressure P. The sensor 1 in FIG. 3A senses an absolute pressure.

In the sensor 1 in FIG. 3A, the passivation layer 4 is preferably about 5,000 A (Angstrom unit) thick, the thin film circuit 2 is preferably 500–10,000 A thick and the insulating layer 3 is preferably 1500 to 3500 A thick. The substrate preferably ranges in thickness from 300 to 1,300 $\mu$m (microns) and diaphragm thicknesses of 5 to 500 $\mu$m are preferred. Diaphragm areas from 500×500 $\mu$m up to 5000×5000 $\mu$m are preferred.

In a sensor as shown in FIG. 3A which senses 0–20 psia, for example, an approximately 5000 A thick passivation layer 4 is deposited over a 1000 A thick thin film circuit 2 which is deposited on a 1500 A thick insulating layer. The insulating layer 3 is deposited on a 318 $\mu$m thick substrate 6 and the diaphragm 9 is 80 $\mu$m thick and extends over an area of 4,500×4,500 $\mu$m. The support layer 60 is 890 $\mu$m thick.

Figure 3B:
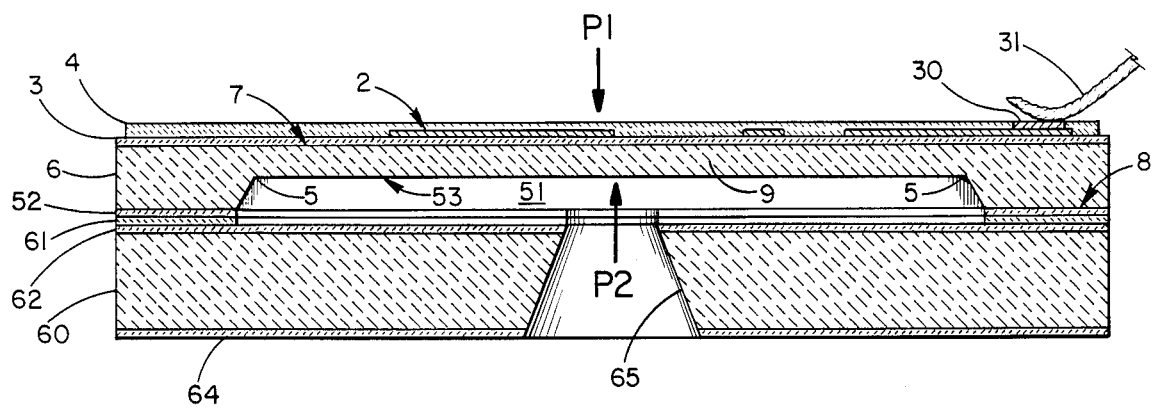

FIG. 3B is a cross-sectional view of a second embodiment of a sensor according to this invention and reference numbers corresponding with those in FIGS. 1 and 3A identify similar parts. A first pressure P1 is applied to a first side 7 of the diaphragm 9. In FIG. 3B, an etch-resistant layer 64 is deposited on support layer 60 to photolithographically define a hole 65 etched through the support layer 60. The hole 65 communicates a second pressure P2 to the second side 53 of diaphragm 9. Hole 65 may be alternatively mechanically drilled or formed by a laser. The diaphragm 9 in FIG. 3B responds to the difference between the pressures P1 and P2. The sensor of FIG. 3B is useful for sensing the differential pressure (P1-P2). One of the pressures, P2, for example, may be atmospheric pressure such that the sensor senses a gauge pressure associated with P1.

Figure 3C:
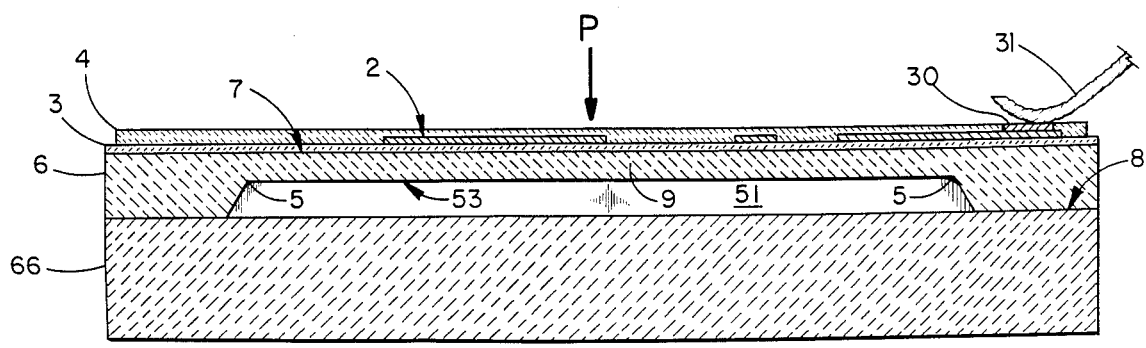

FIG. 3C is a cross-sectional view of an alternative embodiment of a sensor according to this invention and reference numbers corresponding to those in FIGS. 1 and 3A identify similar parts. A pressure P is applied to the first side 7 of the sensing diaphragm 9. In FIG. 3C, the etch-resistant layer 52 (shown in FIG. 3A) has been removed to expose the second surface 8 of the substrate 6. The second surface 8 is electrostatically bonded to a glass support structure 66 in an evacuated environment so that cavity 51 is evacuated and a substantially zero reference pressure is applied to the second side 53 of sensing diaphragm 9. The sensor in FIG. 3C senses the applied pressure P and is an absolute pressure sensor.

Figure 4:
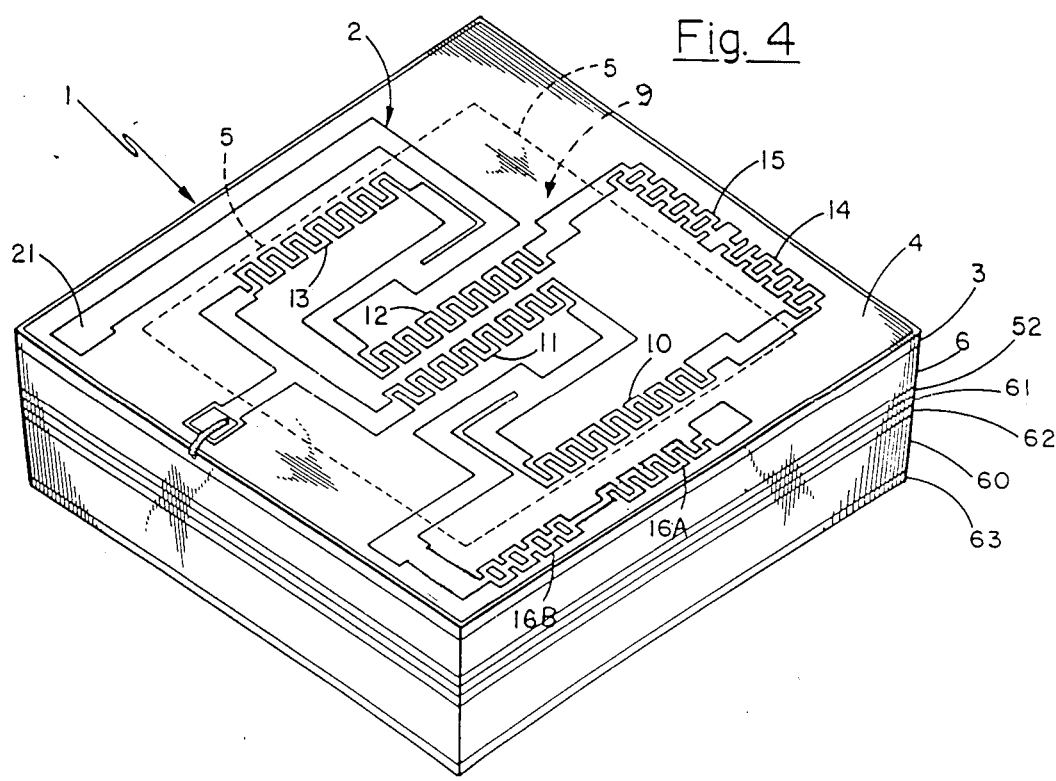
FIG. 4 is a perspective view of a thin film strain gauge pressure sensor according to this invention.

FIG. 4 is a perspective view of a pressure sensor 1 according to this invention corresponding to FIG. 1 and the cross-section shown in FIG. 3B. Corresponding reference numerals identify the same parts in FIGS. 1, 3B and 4. The sensor disclosed in FIG. 4 has a planar rectangular shape which facilitates batch fabrication of multiple sensors in a regular array on wafers of single-crystal material. A first wafer provides the substrate material. The cavities 51 (as shown in FIG. 3B) forming the sensing diaphragms of the sensors are etched in an array of rows and columns on one side of the first wafer. The insulating layer 3 is deposited on the other side of the first wafer. The thin film circuit 2 is formed on the insulating layer 3 (which was previously deposited on the substrate) such that the strain gauges 10, 11, 12, 13 are registered over stressed regions. A passivation layer 4 (outlined in FIG. 4) is deposited over the thin film circuit to substantially protect it from harsh environments.

A second wafer provides the material for the optional support structure 60. Holes 65 (shown in FIG. 3B) are etched through the support layer 60 in a regular array such that the holes may be registered in a later step with the array in the first wafer. A layer of material 62 facilitating bonding is deposited on the second wafer. The first and second layers are registered with one another so that the holes 65 line up with the approximate centers of the respective diaphragms 9. The first and second wafers are bonded to each other using a glass frit 61 to complete an array of sensors. A first selected pressure is applied to the array of sensors such that all of the sensors sense the first selected pressure. Resistive trimming networks 14, 15 are trimmed to provide a substantially zero output at the first selected pressure. Gain-setting resistances 16B are trimmed to provide gain-setting resistances for external amplifiers 44 compensating for the variations in the measured pressure sensitivity factor of each individual sensor.

The trimmed sensors are then separated from the array with a dicing saw.

While the sensors described in the preferred embodiments are rectangular in shape, it is within the scope of this invention to use different shape such as round or hexagonal.

What is claimed:

1. A sensor excited by an excitation means for providing an electrical output responsive to a parameter applied to the sensor, comprising:

a substrate formed of single-crystal material and having a surface thereon with a region strained by the applied parameter;

an insulating layer formed of an electrically insulating material and deposited on the surface of the substrate for transferring strain; and a homogeneous circuit excited by the excitation means for providing the electrical output, the homogeneous circuit being formed entirely of a single substantially homogeneous resistive material deposited as a thin film on the insulating layer, the homogeneous circuit including; a first strain gauge for sensing a strain having an electrical resistance which varies in response to the strain, first electrical resistance means which are adjusted by selective removal of a portion of the first electrical resistance means, the first electrical resistance means being adjusted to set the electrical output to substantially a desired level at a selected level of the parameter, and an interconnect coupled between the first strain gauge and the first electrical resistance means.

2. A sensor as recited in claim 1 wherein the substantially homogenous resistive material comprises a thin film circuit formed of an alloy of nickel and chromium.

3. A sensor as recited in claim 1 wherein the substantially homogeneous resistive material comprises a thin film circuit formed of doped polycrystalline solicon.

4. a sensor as recited in claim 1 further comprising signal processing means having a gain for amplifying the output signal to provide a processed output signal and the circuit means further comprising second resistance means having an electrical resistance which is adjustable to set the gain of the signal processing means by selective removal of a portion of the second resistance means.

5. A sensor as recited in claim 4 wherein the homogeneous circuit is a thin film circuit formed of an alloy comprising nickel and chromium.

6. A sensor as recited in claim 4 wherein the substantially homogeneous resistive material comprises a thin film circuit formed of doped polycrystalline silicon.

7. A sensor excited by an excitation means for providing an electrical output responsive to a stress applied to the sensor, comprising:
a substrate formed of single-crystalline material and having a surface thereon with regions strained by the applied stress;
an insulating layer formed of an insulating material and deposted on the surface of the substrate for insulatingly transferring strains; and
a homogeneous circuit excited by the excitation means for providing the electrical output, and formed entirrely of a single substantially homogeneous resistive material deposited as a thin film layer on the insulating layer, the homogeneous circuit comprising a plurality of strain gauges for sensing strains having electrical resistances which vary in response to strain imposed on the sensor, first resistance means having an electrical resistance which is adjustable to set the electrical output parameter by selective removal of a portion of the first resistance means, and an interconnect coupled between the first resistance means and the strain gauges.

8. A sensor as recited in claim 7 further comprising signal processing means having a gain for amplifying the electrical output to provide a further processed output signal and the circuit means further comprising second resistance means having an electrical resistance which is adjustable to set the gain of the signal processing means by selective removal of a portion of the resistance means.

9. A sensor as recited in claim 7 wherein the homogeneous circuit comprises a Wheatstone bridge circuit and the first resistance means are adjusted to set the electrical output to substantially zero at a selected level of stress.

10. A sensor as recited in claim 9 wherein the substantially homogeneous resistive material comprises a thin film circuit formed of doped polycrystalline silicon.

11. A sensor as recited in claim 9 wherein the substantially homogeneous resistive material comprises a thin film circuit formed of an alloy of nickel and chromium.

12. A sensor excited by an excitation means and responsive to a pressure applied to the sensor for providing an electrical output, comprising:
a substrate formed of a single-crystal material having a diaphragm formed therein and having a surface thereon with a region strained by the pressure applied to the diaphragm;
an insulating layer formed of an electrically insulating material and deposited on the surface of the substrate for insulatingly transferring strain; and
a homogeneous circuit excited by the excitation means for providing the electrical output, deposited as a thin film on the insulting layer and formed entirely of a single substantially homogeneous resistive material, the circuit means comprising a first strain gauge positioned with respect to the diaphragm to sense a strain and having an electrical resistance which varies in response to the strain, a first resistance means having an electrical resistance which is adjustable by selective removal of a portion of the first resistance means, the first resistance means being adjusted to set the electrical output to substantially a zero level at a selected pressure, and an interconnect coupled between the first strain gauge and the first resistance means.

13. A sensor as recited in claim 12 further comprising:
a signal processing means having a gain for amplifying the output signal to provide a processed output signal and the circuit means further comprising second resistance means having an electrical resistance adjusted to set the gain of the signal processing means by removal of a ortionof the second resistance means.

14. A sensor as recited in claim 13 wherein the homogeneous circuit comprises a thin film circuit formed of an alloy of nickel and chromium.

15. A sensor as recited in claim 13 wherein the substantially homogeneous resistive material is doped polycrystalline silicon.

16. A sensor excited by an excitation means having an electrical output parameter responsive to a pressure applied to the sensor for providing an electrical output, comprising:
a substrate formed of a single-crystalline material having a diaphragm formed therein and having a surface thereon with regions strained by the pressure applied to the diaphragm;
an insulating layer formed of an insulating material and deposited on the surface of the substrate for insulatingly transferring strains; and
a homogeneous circuit deposited as a thin film on the insulating layer and formed entirely of a single substantially homogeneous resistive material for providing the electrical output, the circuit comprising a plurality of strain gauges for sensing strains having electrical resistances which vary in response to the strains, first resistance means having an electrical resistance adjusted to set the electrical output parameter by removal of a portion of the first resistance means, and an interconnect coupled between the resistance means and at least one of the strain gauges.

17. A sensor as recited in claim 16 wherein the first resistance means is adjusted to set the output to substantially zero at a selected pressure.

18. A sensor as recited in claim 17 wherein the homogeneous resistive material is doped polycrystalline silicon.

19. A sensor as recited in claim 17 wherein the homogeneous resistive material is an alloy comprising nickel and chromium.

20. A strain gauge sensor, comprising:
a single crystal substrate having first and second generally parallel major surfaces and a cavity formed in the second surface which defines a diaphragm of a reduced thickness;
an insulating layer covering at least a portion of the first surface of the substrate; and
a thin film resistive network formed entirely of a single substantially homogeneous resistive material deposited on the insulating layer, the resistive network including a first strain gauge positioned with respect to the diaphragm, the first strain gauge exhibiting an electrical resistance which varies in response to strain transferred from the diaphragm through the insulating layer to the first strain gauge, resistance means having an electrical resistance adjusted by removal of a portion of the resistance means, and an interconnect coupled between the first strain gauge and the resistance means.

* * * * *

UNITED STATES PATENT AND TRADEMARK OFFICE
CERTIFICATE OF CORRECTION

PATENT NO. : 4,777,826

DATED : October 18, 1988  Page 1 of 3

INVENTOR(S) : Stanley E. Rud, Jr. et al

It is certified that error appears in the above-identified patent and that said Letters Patent is hereby corrected as shown below:

On the front page of the patent, in the title of the application, change "TWIN" to read --THIN--.

On the front page of the patent, in the References Cited section, under U.S. PATENT DOCUMENTS, insert the following references:

| | | | |
|---|---|---|---|
| -- 4,216,404 | 8/1980 | Kurtz et al. | 310/338 |
| 3,858,150 | 12/1974 | Gurtler et al. | 338/2 |
| 3,938,175 | 2/1976 | Jaffe et al. | 357/26 |
| 4,428,976 | 1/1984 | Eisele et al. | 427/96 |
| 3,739,315 | 6/1973 | Kurtz et al. | 427/96 |
| 4,333,349 | 6/1982 | Mallon et al. | 73/708 |
| 4,359,498 | 9/1982 | Mallon et al. | 428/156 |
| 4,443,293 | 4/1984 | Mallon et al. | 156/647 |
| 4,023,562 | 5/1977 | Hynecek et al. | 128/2.05E |
| 4,287,772 | 9/1981 | Mounteer et al. | 73/720 |
| 4,229,130 | 10/1981 | Koneval | 73/766 -- |

UNITED STATES PATENT AND TRADEMARK OFFICE
CERTIFICATE OF CORRECTION

PATENT NO. : 4,777,826

DATED : October 18, 1988

INVENTOR(S) : Stanley E. Rud, Jr. et al

Page 2 of 3

It is certified that error appears in the above-identified patent and that said Letters Patent is hereby corrected as shown below:

-- 4,325,048    4/1982    Zaghi et al. ............338/3
   4,462,018    6/1984    Yang....................338/3
   4,500,864    2/1985    Nakane et al. ...........338/4
   4,291,293    9/1981    Yamada et al. ..........338/4
   4,331,035    5/1982    Eisele et al. ...........73/765
   4,342,217    8/1982    Paetow..................73/1B --

On the front page of the patent, in the References Cited section, under OTHER PUBLICATIONS, insert the following references:

-- Article, "Strain Gage Sensors Get Faster, Smaller", *Design News*, pp. 118, 119, January 7, 1985.

Article, "Laser-Recrystallized Polysilicon Resistors For Sensing...", *Sensors & Actuators*, pp. 527-536, Vol. 4, 1983.

Article, "Polysilicon Layers Lead to a New Generation of Pressure Sensors", *Digest of Technical Papers*, 1985 Int'l. Conference on Solid State Sensors and actuators. --

UNITED STATES PATENT AND TRADEMARK OFFICE
CERTIFICATE OF CORRECTION

PATENT NO. : 4,777,826
DATED : October 18, 1988
INVENTOR(S) : Stanley E. Rud, Jr. et al It is certified that error appears in the above-identified patent and that said Letters Patent is hereby corrected as shown below:

-- Article, "Pellicloid Pressure Sensor", SENSORS, October 1984.--

Column 8, line 48, delete "shape" and insert --shapes--.

Column 9, line 13, delete "solicon" and insert --silicon--; line 14, before "sensor", delete "a" and insert --A--; line 39, delete "entirrely" and insert --entirely--.

Column 10, line 35, delete "ortionof" and insert --portion of--.

Signed and Sealed this

Ninth Day of May, 1989

*Attest:*

DONALD J. QUIGG

*Attesting Officer*     *Commissioner of Patents and Trademarks*